(12) United States Patent
Hrebien

(10) Patent No.: US 10,339,138 B2
(45) Date of Patent: *Jul. 2, 2019

(54) SYSTEM AND A METHOD FOR DETERMINING AN INDEX OF AN OBJECT IN A SEQUENCE OF OBJECTS

(71) Applicant: ADVANCED DIGITAL BROADCAST S.A., Chambesy (CH)

(72) Inventor: Maciej Hrebien, Zielona Gora (PL)

(73) Assignee: ADVANCED DIGITAL BROADCAST S.A., Chambesy (CH)

( * ) Notice: Subject to any disclaimer, the term of this patent is extended or adjusted under 35 U.S.C. 154(b) by 477 days.

This patent is subject to a terminal disclaimer.

(21) Appl. No.: 15/264,610

(22) Filed: Sep. 14, 2016

(65) Prior Publication Data
US 2017/0091278 A1 Mar. 30, 2017

(30) Foreign Application Priority Data
Sep. 30, 2015 (EP) ................................ 15187685

(51) Int. Cl.
*G06F 16/00* (2019.01)
*G06F 16/2455* (2019.01)
*G06F 16/242* (2019.01)
*G06F 16/22* (2019.01)
*G06F 16/20* (2019.01)

(52) U.S. Cl.
CPC ......... *G06F 16/2455* (2019.01); *G06F 16/20* (2019.01); *G06F 16/2237* (2019.01); *G06F 16/2445* (2019.01)

(58) Field of Classification Search
CPC ............ G06F 16/2455; G06F 16/2237; G06F 16/2445; G06F 16/20
See application file for complete search history.

*Primary Examiner* — Apu M Mofiz
*Assistant Examiner* — Husam Turki Samara
(74) *Attorney, Agent, or Firm* — Mark M. Friedman

(57) ABSTRACT

A computer-implemented method for determining an index of an object in a sequence of objects. It is frequently needed to determine an index of an object in a sequence for example in order to request the next object in the sequence. Typically, databases do not include nested records that reference previous/next records. The method provides an improved process for determining an index of an object in a sequence of objects, which may also, in case of no exact match for requested object, provide an index of the object closest to the requested one.

11 Claims, 8 Drawing Sheets

| Index \ property | +name | +number |
|---|---|---|
| 0 | a | 17 |
| 1 | b | 2 |
| 2 | c | 5 |
| 3 | d | 3 |
| 4 | e | 8 |
| 5 | f | 1 |
| 6 | g | 4 |

Fig. 4

| Index \ property | name | | -name <= 'e' |
|---|---|---|---|
| 0 | a | | e |
| 1 | b | | d |
| 2 | c | | c |
| 3 | d | → | b |
| 4 | e | | a |
| 5 | f | | |
| 6 | g | | |
| 7 | h | | |

Fig. 5

| Index \ property | +name | | -name <= 'a' |
|---|---|---|---|
| 0 | c | | |
| 1 | d | | |
| 2 | e | | |
| 3 | f | → | |
| 4 | g | | |
| 5 | h | | |
| 6 | i | | |

Fig. 6

| Index \ property | name | | -name <= 'z' |
|---|---|---|---|
| 0 | a | | g |
| 1 | b | | f |
| 2 | c | | e |
| 3 | d | → | d |
| 4 | e | | c |
| 5 | f | | b |
| 6 | g | | a |

Fig. 7

| Index \ property | name | | -name <= 'd' |
|---|---|---|---|
| 0 | a | | c |
| 1 | b | | b |
| 2 | c | | a |
| 3 | g | → | |
| 4 | h | | |
| 5 | i | | |
| 6 | j | | |

Fig. 8

| Index \ property | name | | -name <= 'e' |
|---|---|---|---|
| 0 | a | | c |
| 1 | b | | b |
| 2 | c | | a |
| 3 | f | → | |
| 4 | g | | |
| 5 | h | | |
| 6 | i | | |

Fig. 9

| Index \ property | name | | -name <= 'e' |
|---|---|---|---|
| 1 | 100 | | 123 |
| 2 | 101 | | 110 |
| 3 | 110 | | 101 |
| 4 | 123 | → | 100 |
| 5 | 145 | | |
| 6 | *160* | | |
| 7 | *175* | | |
| 8 | *205* | | |
| 9 | *308* | | |
| 10 | *321* | | |
| 11 | 322 | | |
| 12 | 334 | | |
| | | | |
| | | | |

Searching window

Fig. 11

SYSTEM AND A METHOD FOR DETERMINING AN INDEX OF AN OBJECT IN A SEQUENCE OF OBJECTS

The present invention relates to a system and method for determining an index of an object in a sequence of objects.

Sequences of objects are typically available as a result of querying a source of data, such as a database, using a suitable query such as an SQL (Structured Query Language) query, or UPnP (Universal Plug-and-Play) (AKA DLNA (Digital Living Network Alliance)) Content Directory Service (CDS) [ref: http://www.upnp.org/specs/av/UPnP-av-ContentDirectory-v1-Service.pdf] Search action.

There are frequently cases when a sequence of objects is available comprising a plurality of objects, which can be retrieved from the sequence. A query may specify search criteria determining which objects will be available in the query result and order criteria determining order of objects in the query result. For example, in relational databases a table is a container of records, that can be queried with SELECT statements, the search criteria are specified with a WHERE clause and the order criteria are specified with the ORDER BY clause. Another example is UPnP CDS Search action with accordingly specified SearchCriteria and SortCriteria.

A result of such a query is a sequence of objects. The objects may be considered to reside at consecutive, unique indexes (or otherwise unique identifiers or keys) in the sequence being a result set of a query. It is not relevant what is a format of the unique index as long as each object in the sequence has a different value of the index.

The query results are typically expressed by an iterator-like API, for example, SQL database cursor, or StartingIndex and RequestedCount pair in UPnP CDS Search action. Such approach provides a fragment of the query result sequence at a time, instead of the whole result objects set. This may improve transmission and storage performance. The iterator/fragment is related to an index in the sequence, at which an object (or number of objects) is provided.

In order to access objects from the sequence, that are not available at a current iterator/fragment index, the iterator/fragment shall be moved to a new index. The index move operation may be time-consuming or asynchronous, thus iteration over the whole sequence is not a trivial task.

However, in many applications only a fragment of the query result sequence is under concern, what makes this approach a convenient and commonly used pattern.

It is frequently needed to determine an index of an object in a sequence for example in order to request the next object in the sequence. Typically, databases do not include nested records that reference previous/next records. This approach would be inefficient because the previous/next references would have to be rebuilt with each ordering of the sequence.

It would be also desirable to provide an improved method for determining an index of an object in a sequence of objects, which could also, in case of no exact match for requested object, provide an index of the object closest to the requested one.

There is presented a computer-implemented method for determining an index of an object in a sequence of objects, the method comprising the steps of: obtaining a unique identifier value of a given object O; obtaining a query definition Q of a sequence, the Q query including an order definition according to a parameter of the O object; constructing a Q' query based on the Q query, the Q' query being different from the Q query by having a reversed ordering of results, with respect to the Q query, and providing results having said parameter value of objects preceding or matching the parameter value of the object O in the sequence of objects in the Q query result set; executing the Q' query by a query execution engine; checking whether the object O is matched exactly with the first item in Q' result set and in case it is not matched, requesting one object at position P and one object at position P+1, the position P being the position of an object from Q result set corresponding to the first item of Q' result set; and in case the Q' result set is empty, choosing an object at the first position in Q result set as the closest one to the object Q; in case only one of the requested objects is available, choosing the object at the last position of Q result set as the closest one to the object O; in case both objects at position P and position P+1 are available, determining which of these objects is closer with respect to the object O and choosing this object as the closest object; and determining the index of the selected closest object in Q sequence as the index of the closest object to the O object.

Preferably, the unique identifier value is a numerical value.

Preferably, the identifier of the object and the parameter of order definition are the same properties of the object O.

Preferably, prior to step the method further comprises the steps of: checking whether sort criteria and object constraints match, and in case they do match, proceeding with step, and in case the sort criteria and object constraints match: stepping over the data set one element by one for exact match and checking whether the exact match has been found; in case of finding exact matching object, returning position of the first exactly matched object; in case of not finding exact matching object, returning position of the closest object determined during step by step comparison.

Preferably, in case objects at position P and position P+1 are equally distanced to the requested object O, the object of a higher or lower position is returned, depending on system configuration.

Preferably, prior to constructing query Q', the values of parameters of the object O are obtained.

Preferably, if the query Q ordering is not strict, then query Q is replaced by query Q1 by the additional order criteria that makes Q1 ordering strict.

Preferably, the additional order criteria, in said Q1 query, refer to unique identifiers of objects.

Preferably, the executed query Q' is constructed such that the retrieval of the total count of the Q' results utilizes the already available results.

Preferably, the query is executed in an SQL database.

There is also presented a computer program comprising program code means for performing all the steps of the method as described above when said program is run on a computer, as well as a computer readable medium storing computer-executable instructions performing all the steps of the method according as described above when executed on a computer.

There is also presented a computer-implemented system for determining an index of an object in a sequence of objects, the system being characterized in that it comprises: an object O register configured to store a unique identifier value of a given object O; a source query Q register configured to store a query definition Q of a sequence, the Q query including an order definition according to a parameter of the O object; a destination query register configured to store a newly constructed Q' query based on the Q query; wherein a source query order inverter is configured to reverse ordering of results, with respect to the Q query; a controller configured to obtain the output of the source query order inverter and define the Q' query, the Q' query being different from the Q query by, providing results having parameter's value of objects preceding or matching the parameter value of the object O in the sequence of objects in the Q query result set; the controller being further configured to: request execution of the Q' query by a query execution engine and check whether the object O is matched exactly with the first item in Q' result set and in case it is not, request one object at position P and one object at position P+1, position P being the position of an object from Q result set corresponding to the first item of Q' result set; and in case the Q' result set is empty, choose an object at the first position in Q result set as the closest one to the object O; in case only one of the requested objects is available, choose the object at the last position of Q result set as the closest one to the object O; in case both objects at position P and position P+1 are available, determine which of these objects is closer with respect to the object O and choosing this object as the closest object; and determine the index of the selected closest object in Q sequence as the index of the closest object to the O object.

The present invention is shown by means of exemplary embodiments on a drawing, in which:

FIG. 1 presents a method known in the art;

FIG. 2 presents a method according to the present invention;

FIG. 3 presents additional steps of the method according to the present invention; and FIG. 4-9 present examples of operation of the method.

FIG. 11 shows an exemplary implementation of the invention.

NOTATION AND NOMENCLATURE

Figure 1:
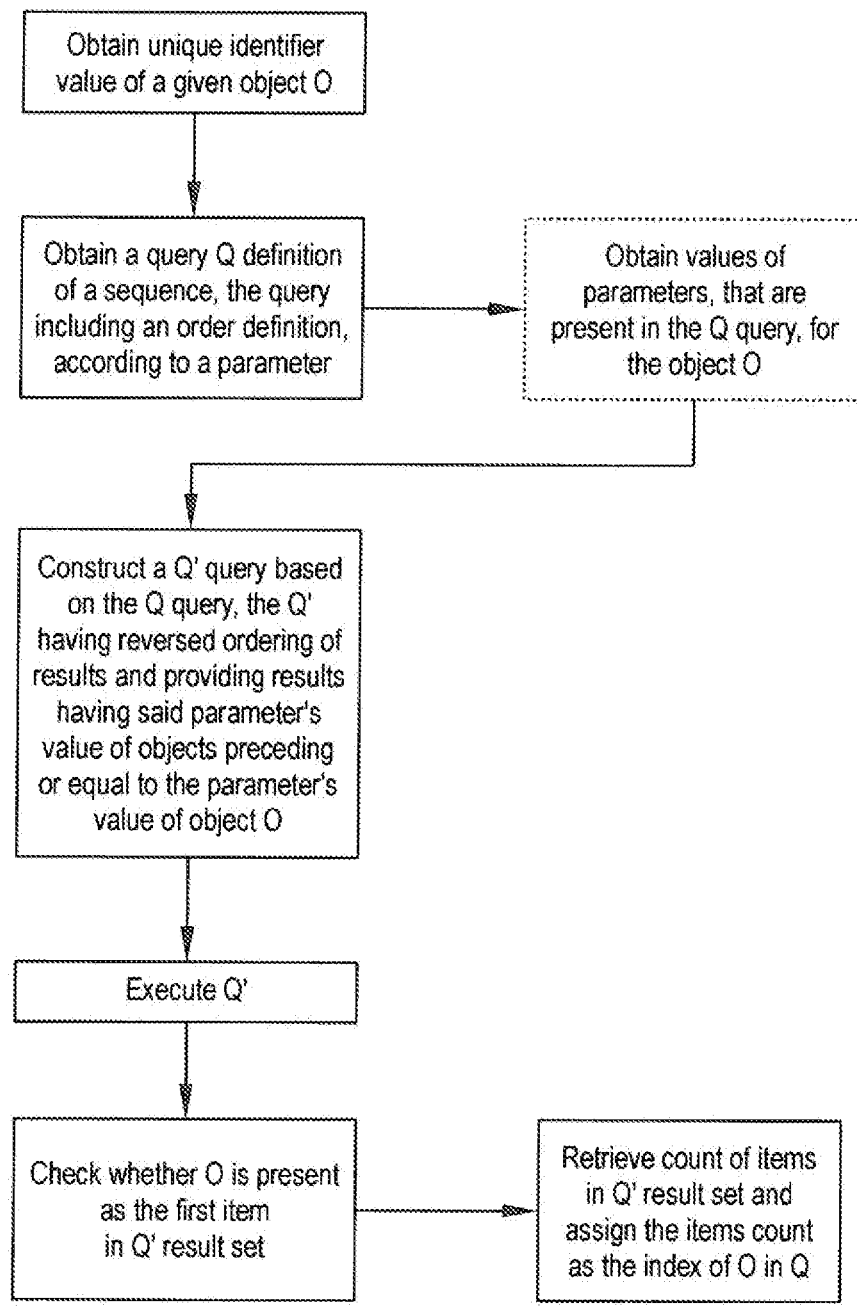

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

DETAILED DESCRIPTION

The method presented herein can be applied for example to a tree-like container for grouping elements from various data sources to a tree structure. The container will be called herein AMC (Advanced Media Container).

The AMC data sources (also called data providers) can operate synchronously or asynchronously. The sources can be internal, e.g. provide data collected in a memory of the system in which the container operates. For example, if the system is a digital television decoder, the internal data source can be e.g. an Electronic Program Guide (EPG). The data sources can be also external to the device, e.g. Video-on-demand servers with which the digital television decoder communicates on demand. The AMC combines all data providers to a single entity, which allows them to communicate in a single layer and with higher-level layers, e.g. high level applications operated in the system. The tree structure has a root and higher-order containers and elements (also called items). A container can group several elements. At each level the containers and elements can be mixed. The AMC may provide mechanisms for extracting information from the tree structure, such as a Find or Search commands. For example, a search command can be executed for a specified level of the tree with some parameters, such as:

Search_criteria—to specify the parameter(s) of containers or elements to be found. The syntax may follow "UPnP Content Directory Service" SearchCriteria parameter syntax;

Sort_criteria—to specify the sorting order of returned elements. The syntax may follow The data can be returned in a so-called "View", each view having a start (starting_index) and size (requested_count). The size can be defined in the search command.

One example of a sequence of objects is a list of content, applicable for example in content receivers such as digital television set-top boxes.

Let's assume that a user interface application for a digital television decoder allows the user to navigate via various lists (list of movie channels, list of comedy channels, list of cartoon channels, etc.). In such as case there arises a problem of keeping the track of the currently presented object in different contexts. For example, let's assume a SoccerChannel from SportChannels list is currently played and the end-user changes the context of the channel to OutdoorSportChannels list, which also contains the Soccer-Channel. The application for handling the lists has to find the position of the SoccerChannel on the new list (Outdoor-SportChannels) and move the "window" related to this channel somewhere around the found position to have theSoccerChannel in the new context.

Since the most straightforward solution to the above stated demand is computationally costly and requires N comparisons in the worst case (linear search of the object in the new context), the functionality described herein has been introduced. It allows the user to determine object's position in a sequence of objects defined by View's search_criteria and sort_criteria.

The solution assumes that the object can be "outside" the View's range defined by the starting_index and the requested_count parameters. The object's position search action, beside the mentioned search_criteria and sort_criteria is based on given object's property value(s), e.g. number=123, which uniquely identify the object in the sequence of objects. That is, the position of the object that meets View's search_criteria as well as additional object's constraints (e.g. number=123) is returned as a result. Alternatively, an #id property value can be passed as the object's constraint/reference. In such a case the position of the object which meets View's search_criteria and has selected property value(s) equal to the object identified by the #id property is searched for and returned as a result. Here, the "selected property value(s)" are determined using the passed sort_criteria_str parameter.

According to the present invention it is assumed that identity of an object O is known a'priori. The identity may refer to some unique identifier or a primary key of the object. In database structures (typically tables) a unique key or primary key is a key that uniquely defines the characteristics of each row. The primary key has to consist of characteristics that cannot collectively be duplicated by any other row. In UPnP CDS the identity is defined by means of ObjectID. In AMC the identity can be defined by means of so-called #id property.

Nevertheless, all properties of the object O are not necessarily known a'priori.

There is also an assumption that a query Q definition (parameters) is known a'priori. This query may be defined by a user of the system. As already indicated, another assumption is that the order of objects in the query result sequence is deterministic, that is the query Q order criteria are defined in the way, that the order is strict.

A query result representing a sequence is a finite sequence and its cardinality is easily available. For example, in case of an SQL Database together with each record data, an additional count column (count(*) in SQL) may be added. For another example, in case of UPnP CDS Search action the TotalMatches provides information on the sequence cardinality. For yet another example, in case of AMC the total_matches parameter may specify how many objects (i.e. elements that meet the search_criteria for a given container) are present in a given View.

Note, that the cardinality information is typically provided as a part of each Search action result.

The problem is to determine if a given object O can be found in the result sequence of a given query Q. A more specific problem is to determine an index of the object O in the result sequence of the query Q, or to provide index of an object closest to the object O in case object O cannot be found.

A solution to the first part is known from the prior art, e.g. from EP2899924 (A1). EP2899924 (A1) teaches to construct a query Q', the Q' query being different from the Q query in that: (a) If an object is in results sequence of Q', then it is in result sequence of Q, (b) Only objects that compares less than or equal to O are in results of O' and (c) Q' order is the reverted order of Q. Less than or equal means preceding or matching O in the sequence of objects in Q result set.

The result of the above is that if the object O is in the results sequence of Q', then it is the first element in this sequence (thus may be easily obtained, without iteration). Hence, only this single first element of Q' results has to be checked to solve the problem. Further, if the object O is in the results set of the Q query, then its index, in the Q query results sequence, is equal to total size of results sequence of the Q' query (starting from index 1).

If the Q query order is not strict (there can exist objects with random order in results sequence), then the above solution cannot be applied directly. However, the Q query may be easily changed to some Q1 query in order to provide a strict ordering by adding appropriate secondary order criteria, that is by the objects' identity (that may be any unique key, including the aforementioned primary key).

The queries Q' for the Q queries may be constructed automatically with an analysis of its search criteria and order criteria: The Q' order criteria are the reverted Q query order criteria, and the Q' query search criteria may be constructed as Q query search criteria AND <condition, that objects precede or equal the object O>. The reverted order criteria means, that each ascending order parameter Pi in Q becomes descending order parameter Pi in Q', and each descending order parameter Pi in Q becomes ascending order parameter Pi in Q'.

The condition that objects precede or equal the O object with the respect to the Q query order) may be automatically established from the Q query order criteria. In an exemplary embodiment, the following procedure may be applied for this purpose.

Let the Q query be ordered by P1 . . . Pn parameters, where P1 is a parameter of the primary ordering criterion, the P2 is a parameter of the secondary ordering criterion and so on. Let O.Pi denote the value of parameter Pi of the object O. The condition that the object precedes or equals O, with respect to parameters Pi . . . Pn, may be expressed in a recursive way as a Ci condition such that:

Ci: Pi<O.Pi OR (Pi=O.Pi AND Ci+1)—when i<=n and Pi order is ascending;

Ci: Pi>O.Pi OR (Pi=O.Pi AND Ci+1)—when i<=n and Pi order is descending; and

Ci: TRUE—otherwise (when i=n+1).

Thus the C1 is the desired condition that an object precedes or equals O with respect to Q ordering criteria.

Example: In SQL the query Q specification may look like: "SELECT* FROM aTable WHERE foo<=10 ORDER BY bar ASC, baz DESC" and the object O properties have values {foo: 7, bar: 4, baz: 70}. Then the specification of Q' would be: "SELECT*FROM aTable WHERE (foo<=10) AND (bar<4 OR (bar=4 AND (baz>70 OR (baz=70 AND TRUE)))) ORDER BY bar DESC, baz ASC". Equivalent example for UPnP CDS can easily be constructed.

FIG. 1 presents a method known in the art, namely in EP2899924 (A1). The procedure starts from obtaining a unique identifier value of a given object. Typically, such an identifier will be a numerical value such as an integer value. Subsequently, there is obtained a query definition (the Q query as explained previously) of a sequence, the query including an order definition according to a parameter of the O object. For the sake of completeness, it is irrelevant whether this step is executed after or before or in parallel to the step of obtaining the identifier.

Next, values of parameters that are present in the query definition are obtained for the object O, preferably with a use of the unique identifier of this object O. If the values for the object O of the parameters are known a'priori, then this step may be omitted.

It is to be noted that the identifier of the object O and the parameter of order definition may be the same properties of the object O, such as, for example, they refer to the same column of a database table.

Next, there is constructed a Q' query based on the Q query, the Q' having reversed ordering of results, with respect to the Q query, and providing results having said parameter's value of objects less than or equal to the parameter's value of the object O, Less than or equal means preceding or matching the O in the sequence of objects in Q query result set. The parameters values obtained in previous steps may be used to complete the Q' query definition.

For example, if the Q query result set shall have an ascending order on Column1 values, the Q' query shall have a descending order on Column1 values. Additionally, the Q' query requires a condition that the identifier's value is equal or less than (Less than or equal here means preceding or matching the O in the sequence of objects in the Q query result set) than the value of the object O identifier's value.

In case the Q query has a descending order, the Q' lists all objects having the selected parameter greater than or equal (Greater than or equal here means preceding or matching O in the sequence of objects in the Q query result set) than the value of the object O parameter's value (eg. identifier).

Subsequently, there is executed (by a query execution engine such as a database server engine) the Q' query followed checking whether the object O is present as the first item in Q' query result set. If it is, the index of the O object in the Q query sequence is obtained by counting (or retrieving the count of) items in the Q' query result set and subsequently assigning the items count as the index of the object O in the Q query result set. Preferably, the retrieval of the total count of the Q' results utilizes the already available results.

The problem occurs when the exact match cannot be found. The present invention provides a solution to this problem. The invention covers cases when exactly matching element cannot be found, as well as the case when the set is not ordered or the given constrains do not match ordering method well. In the first case, an element that is closest to the one requested (minimal distance between properties given in the constraints including multi-values of such properties) can be returned. The solution of finding the closest one is designed in such a way that minimizes potential data accesses (what also means higher speed at middleware level). In the second case, as the set is not in order, a linear search mode is triggered. The simplest example can be so-called direct selection when a user tries to select a service using its RCU entering number that does not exist. In such a case the closest service is selected and tuned into, e.g. we have 1, 2, 3, 8, 10 and user selects 5 (3 will be returned). Finding an index (position) of an object that meets given constraints in a set of ordered elements is executed while minimizing data access steps.

Figure 2:
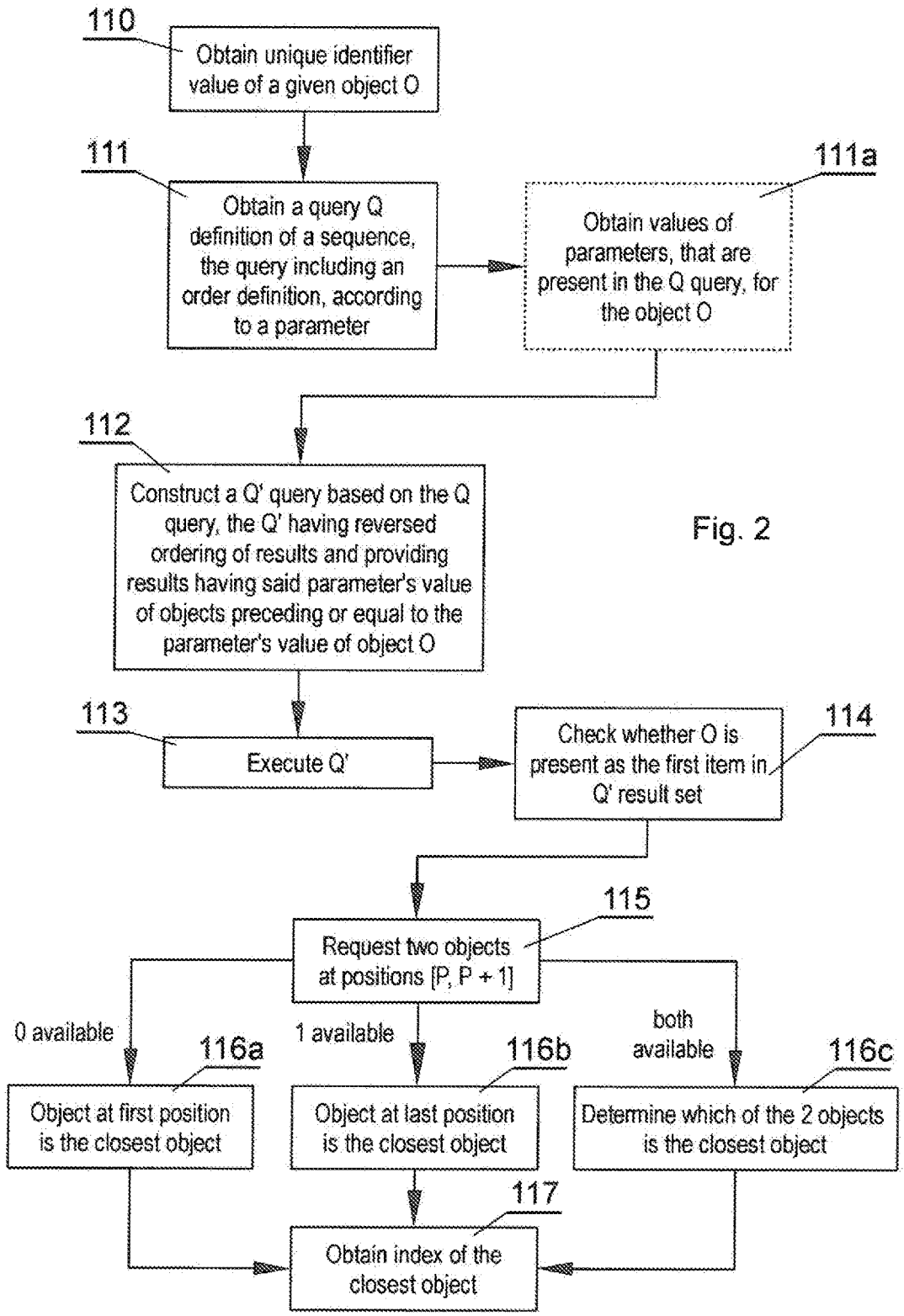

FIG. 2 presents a method according to the present invention. The procedure starts at step 110 from obtaining a unique identifier value of a given object. Typically, such an identifier will be a numerical value such as an integer value. Subsequently, at step 111, there is obtained a query definition (the Q query as explained previously) of a sequence, the query including an order definition according to a parameter of the O object. For the sake of completeness, it is irrelevant whether step 111 is executed after or before or in parallel to step 110.

Next, at step 111*a*, values of parameters that are present in the query definition from step 111, are obtained for the object O, preferably with a use of the unique identifier, from step 110, of this object O. If the values for the object O of the parameters from step 111 are known a'priori, then the step 111*a* may be omitted.

It is to be noted that the identifier of the object O and the parameter of order definition may be the same properties of the object O, such as, for example, they refer to the same column of a database table.

Next, at step 112, there is constructed a Q' query based on the Q query, the Q' having reversed ordering of results, with respect to the Q query, and providing results having said parameter's value of objects less than or equal to the parameter's value of the object O. Less than or equal means preceding or matching the O in the sequence of objects in Q query result set. The parameters values obtained in step 111*a* may be used to complete the Q' query definition.

For example, if the Q query result set shall have an ascending order on Column1 values, the Q' query shall have a descending order on Column1 values. Additionally, the Q' query requires a condition that the identifier's value is equal or less than (less than or equal here means preceding or matching the O in the sequence of objects in the Q query result set) than the value of the object O identifier's value. In case the Q query has a descending order, the Q' lists all objects having the selected parameter greater than or equal (greater than or equal here means preceding or matching O in the sequence of objects in the Q query result set) than the value of the object O parameter's value (e.g. identifier).

Subsequently, at step 113, there is executed (by a query execution engine such as a database server engine) the Q' query followed by step 114 of checking whether the object O is present as the first item in Q' query result set. If it is, the index of the O object in the Q query sequence is obtained at step 106 by counting (or retrieving the count of) items in the Q' query result set and subsequently assigning the items count as the index of the object O in the Q query result set. The retrieval of the total count of the Q' results can utilize the already available results. However, in case the object O is not present as the first item in Q' query result set, then the procedure continues with step 115. In step 115, the are requested two objects at positions [P, P+1]. More precisely, one object is requested at position P and one object is requested at position P+1, wherein position P is the position of an object from the Q result set that corresponds to the first item of the Q' result set. Next, it is checked how many and/or which objects are available upon request of step 115. In case the Q' result is empty, and consequently there is no object in Q result set that could be defined as being located at P or P+1 position as described above, then the object at the first position of Q result set is selected 116*a* to be the object closest to the object O. In case, upon request of step 115, there is available only one object in Q result set that could be defined as being located at P or P+1 position as described above, then the object at the last position of Q result set is selected 116*b* to be the object closest to the object O. In case, upon request of step 115, there are available two objects in Q result set that could be defined as being located at P or P+1 position as described above, then it is determined 116*c* which of these two objects is the object closest to the object O. It can be done in form of a comparison $\|x-a\| \leq \|x-b\|$, wherein "a" is the first object at position P and "b" is the second object at position P+1, and "x" represents the searched object O. It should be noted that this can be a multi property/multi value comparison of integers, dates, texts, etc.

Consequently, if "a" is closer to "x" (i.e. object O), then the object at position P is the closest one, and if "b" is closer to "x" (i.e. object O), then the object at position P+1 is the closest one. In case objects at position P and position P+1 are equally distanced to the requested object O, the object of a higher position can be returned (alternatively, the object of a lower position can be returned, depending on the system configuration).

Figure 3:
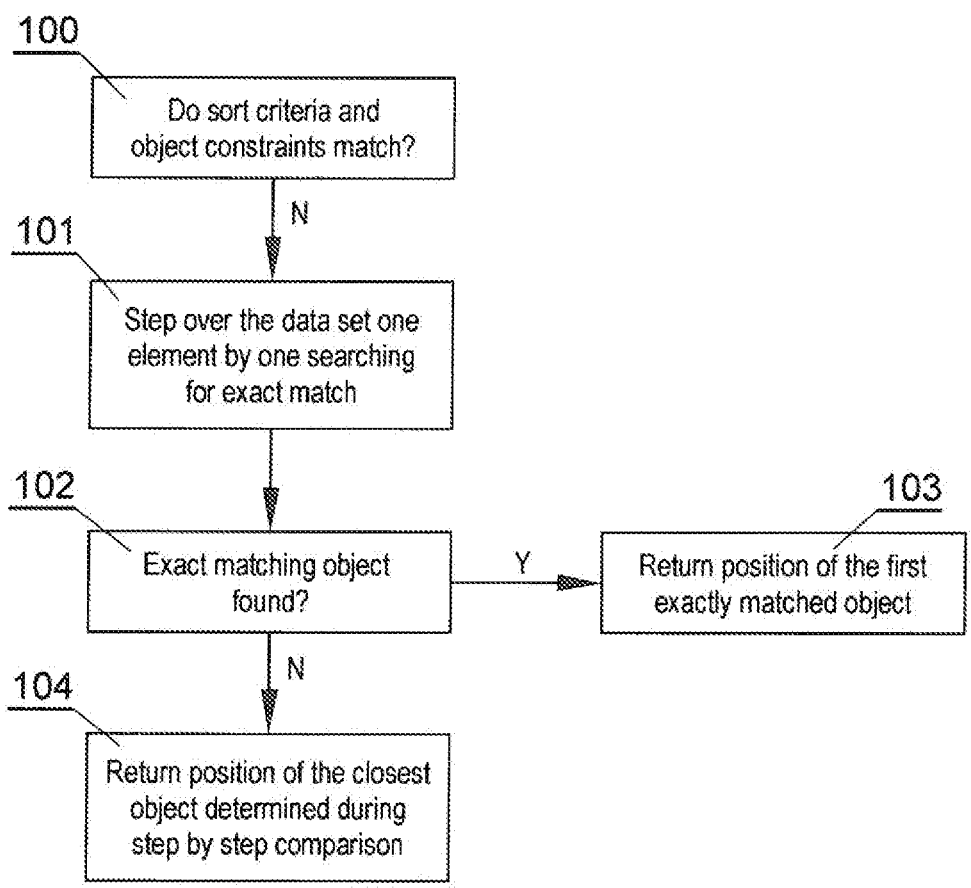

FIG. 3 presents additional steps of the method according to the invention. Prior to step 110 it is checked whether sort criteria and object constraints match, and in case they do, the method proceeds with step 110. However, the method can further comprise steps that are executed in case sort criteria and object constraints do not match. In such case, there is performed stepping 101 over the data set one element by one for exact match and checking 102 whether the exact match has been found. If the exact matching object is found, then in step 103 the position of the first exactly matched object is returned. In case of not finding exact matching object, position of the closest object determined during step by step comparison is returned in step 104. Therefore, as compared to step 101, the index of the currently closest element for a particular iteration stage is remembered—if during the next comparison a smaller distance will be calculated, the index is replaced. In case no exact match can be found, the index of the currently closest element is returned.

FIG. 4 presents a first example of operation of the described method. In this case the sort criteria are +name, +number, and the constraints are "number=6". As can be seen, the number column depends on the name column and as a standalone is unordered, thus the algorithm cannot be used and step by step search is needed. This corresponds to the situation, when in step 100 it is determined that the sort criteria and/or object constraints do not match. In this case, the step by step search 101 is carried out.

FIG. 5 presents the second example of operation of the described method. In this case, sort criteria is +name and constraints are "name=e". The result obtained according to the presented method is 4 (total matched (5)−1). This represents the situation when the exact matching object is found at step 114. In such case, there is no need to proceed further and the count of the result set from Q' is the index of the found object.

FIG. 6 presents another example of operation of the described method. In this case, sort criteria are +name and constraints are "name=a". In this case an empty set represents the situation that there are no objects which meet given constraints (no objects which name property is less then 'c'). Thus, the total matches is 0 and that means the first object in the set ('c' at 0) is the closest one. This represents from the step 116a.

FIG. 7 presents another example of operation of the described method. In this case, sort criteria are +name, and constraints are "name=z". In this case, the result is 6. Since the total matches equals to set's size and there is only one object at position [6, 7], i.e. [P, P+1]–(the 'g' one)—this concludes that the closest object is the last one in the set.

FIG. 8 presents another example of operation of the described method. In this case, sort criteria are +name, and constraints are "name=d". In this case, the result is 2. Since there are more than one objects available after the first part of the search (which means that the objects for further analysis are at [2, 3]-position 'c' at 2 and 'g' at 3) a distance has to be calculated that will decide which object is closer to our searched one. Note that the distance calculations are performed over all the properties of the object (all properties given as constraints) and all the values of the properties (so-called multi-values) which can be integers, dates or text. In this simple example, 'c' is lexicographically closer to 'g' which means that position 2 (position P) is the result.

FIG. 9 presents another example of operation of the described method, in this case, sort criteria are +name, and constraints are "name=e". In this case, the result is 3. This is a case similar to the one from FIG. 8, except that here the second (P+1) object (from [2, 3] range) is 'f' is lexicographically closer to the searched 'e'. So, the conclusion is that the result is P+1, that is 3.

Figure 10:
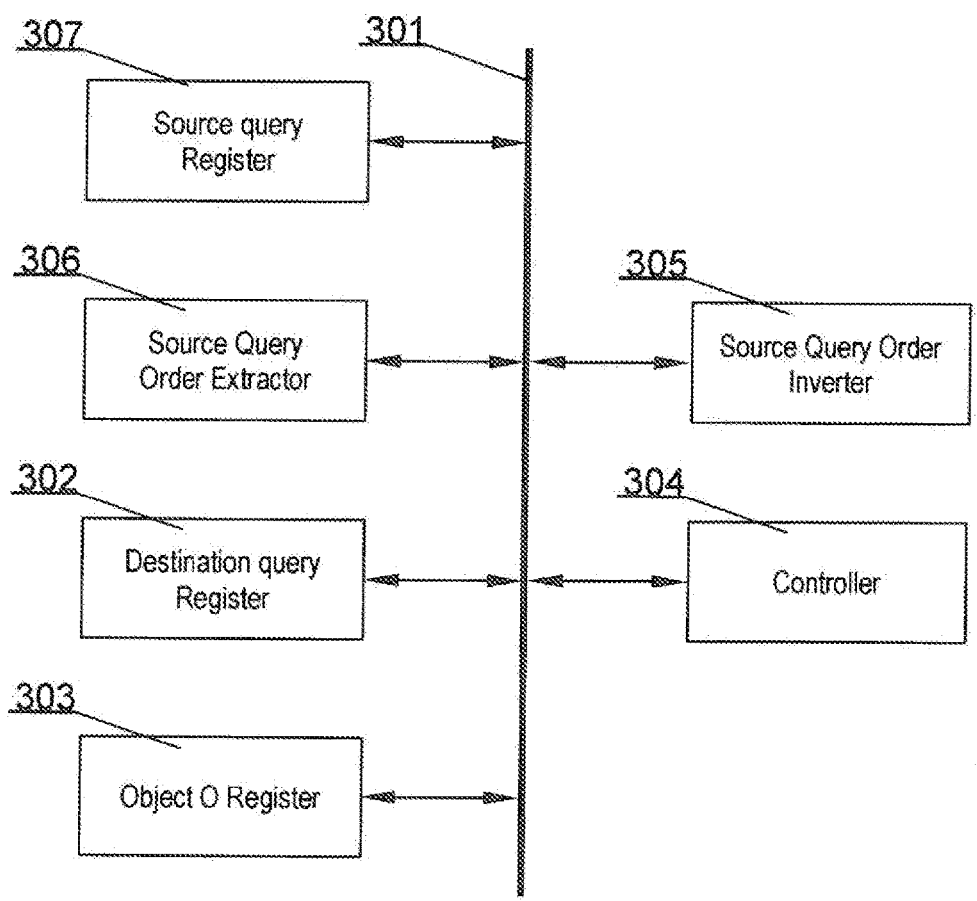
FIG. 10 shows a system according to the present invention.

FIG. 10 presents a system according to the present invention, if implemented in hardware, as in an alternative embodiment, the present system can be implemented with any suitable combination of discrete logic circuits having logic gates for implementing logic functions upon data signals, such as an application specific integrated circuit (ASIC) having appropriate logic gates, a programmable gate array(s) (PGA) or a field programmable gate array (FPGA), etc.

The system comprises a data bus 301, that may communicate internal as well as external modules. For example, an external module may input a source query Q in a source query register 307 and input object O data in an object O register 303.

The controller 304 is configured to communicate the query Q, present in the source query register 307, to a source query order extractor 306 that reports to the controller 304 information defining sorting order present in the Q query. Subsequently, the controller 304 communicates with a source query order inverter in order to invert the order of the query stored in the source query register 307.

The controller 304 is configured to communicate with the object O register 303 in order to extract the value of the object O of the parameter used in the sorting process. Once the controller is in possession of the input query, the inverted query order and the value of the parameter of the object O, the controller 304 outputs, to a destination query register a Q' query taking into account an appropriate use of "<" or ">" parameters as explained earlier in the description.

The controller 304 is further configured to request execution 104 of the Q' query by a query execution engine and to check 105 whether the object O is present as the first item in the Q' query result set and if it is, to obtain the index of the O object in the Q sequence 106 by retrieving objects count of the Q' result set.

The controller 304 is also configured to request objects at position [P, P+1] and recognize the closest object based on availability and/or value of requested objects (116a, 116b, 116c). Finally, the controller 304 is configured to output the index of the closest object from steps 116a or 116b or 166c as the index of the object closest to the requested object O.

The controller 304 may further comprise an internal memory for storing computer software that provides instructions for the controller. The instructions for the controller allow for execution of the method according to the present invention.

The particular implementation as show above has been discussed with respect to the AMC container. It can be used also in any other data containers, where data is to be retrieved using parameters such as search_cirteria, sort_criteria, starting_index and requested_count, wherein the position of the closest element cannot be easily extracted.

It is assumed that the object's position search action is performed in the context of AMC View and the passed search_criteria_str and sort_criteria_str parameters are crucial for correct operation. The API user registers a cancellable response callback and calls the position search action waiting for asynchronous response. The additional searched object's constraint(s) are used to uniquely identify the object.

In the basic scenario it is assumed that the object has one additional constraint (e.g. number=123) which is used to determine its position in the sequence of objects defined by View's parameters. Thus, there are three crucial parameters: View's search_criteria_str, View's sort_criteria_str and object's constraints. For example:

search_criteria_str: type="video"
sort_criteria_str: +number
object_constraints: number="123"

which means that in the context of a View with "video" type
   of content sorted ascending by number the position of the
   object which has the number property equal to 123 is
   searched for. Note that the found position can point
   outside the current View's range, that is before
   starting_index or after starting_index+requested_count.

The internal search query in such a scenario will have the following form:

```
search_criteria_str*: (search_criteria_str) AND (
(property1 < property1_value) OR
(property1 = property1_value AND TRUE)
)
)
sort_criteria_str*: -/+ property1
``` from definition, that is following directly from EP2899924 (A1) or simply:
search_criteria_str*: (search_criteria_str) AND (property1<=property1_value) sort_criteria_str*: -/+property1
where -/+ means reverse ordering of a property ordered+/- in the source View's order_criteria_str. Substituting the exemplary data the internal AMC search query will have the following form:
search_criteria_str*: (type="video") AND (number<="123") sort_criteria_str*: -number The total_matches count of such the internal query will give the position of the object in the sequence of data defined by View's parameters. The position is the final result of the query. For example, as shown in FIG. 11, total_matches is equal 4, which means that the searched object has position equal to 4 in the source View.

The scenario presented in the Basic scenario section is basic in the sense that only one property is used as the sort_criteria_str. A more advanced object's position search action could have two, three and more sort criteria which means that the searched object's constraints could also be more advanced and extended. For example when three order criteria are given the internal AMC search query will have the following form:

```
search_criteria_str*: (search_criteria_str) AND (
(property1 < property1_value) OR ((property1 = property1_value)
AND (
(property2 < property2_value) OR ((property2 = property2_value)
AND (
(property3 <= property3_value)))
)
)
)
sort_criteria_str*: -/+ property1, -/+ property2, -/+ property3
```

For example, assuming that an AMC View is defined with the following parameters:
search_criteria_str: addedTime>"NOW-604800"
sort_criteria_str: -presentationCount,+artist,+name
and one is searching for the position of the object that meets the following constraints:
object_constraints: presentationCount="5", artist="Vivaldi", name="The Four Seasons"
Thus, the internal AMC query will have the following form:

```
search_criteria_str*: (addedTime > "NOW-604800") AND (
(presentationCount > "5") OR ((presentationCount = "5") AND (
(artist < "Vivaldi") OR ((artist = "Vivaldi") AND (
(name <= "The Four Seasons")))
)
)
)
sort_criteria_str*: +presentationCount,-artist,-name
```

Note the (presentationCount>"5") condition—it is reversed (greater instead of less) because of the first sort criteria (equal to "-presentationCount" in this example) which is descending. As in the basic scenario the resulting total_matches gives the position of the searched object which is the final result of the query.

When searching for an object that meets given constraints it is possible that the object cannot be found (is not available in the view—exact matching is unavailable). In such a case position of a nearest object can be returned. The functionality can be achieved by passing "findNearestObject" constraint equal to "true":
object constraints: findNearestObject="true" and executing the method according to the invention. Thus, when exactly matching object is not found/available the position of the nearest one will be returned. Note that when there are two objects with equal distance to consider the higher position (or lower, depending on the system configuration) will be returned. In case we cross first/last bound the first or last available position is returned respectively. The distance is calculated over all of the constraints (except the "findNearestObject").

As mentioned in the earlier sections the properties from the sort criteria and the properties from searched object constraints are correlated and crucial for the algorithm. If a constraint cannot be specified (it is unknown in advance), e.g.:
sort_criteria_str: +category,+number
and only number is known (like in the "direct selection" mode) there is no way to use the algorithm as the "number" column (second criteria) depends on the "category" column (first criteria) and is not in order in global meaning over the whole view), like:
+category|+number
a|7
b|9
c|1
c|5
d|3
e|2

In such a case the algorithm is switched to linear search mode and returns position of the first matched object that meets the given constraints (or the nearest one if the "fineNearestObject" constraint is given.

Since it is possible that the searched object does not exist in the sequence of data defined by View's parameters the results of the queries described in the Basic scenario and Advanced scenario sections are validated. The validation ensures that the object at the first position of the internal query result meets object's constraint(s), that is has properties equal to the one requested. If yes, the position of the object is returned, else "not found" message is passed to the registered callback. Note that the "exact" match can be relaxed with the "find nearest object" functionality described here.

It can be easily recognized, by one skilled in the art, that the aforementioned method for determining an index of an object in a sequence of objects may be performed and/or controlled by one or more computer programs. Such computer programs are typically executed by utilizing the computing resources of the device. The computer programs can be stored in a non-volatile memory, for example a flash memory or in a volatile memory (or otherwise a non-transitory computer readable medium), for example RAM and are executed by the processing unit. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

In addition, any combination of the appended claims in envisaged in the present application.

The invention claimed is:

1. A computer-implemented method for determining an index of an object in a sequence of objects, the method comprising the steps of:
   obtaining a unique identifier value of a given object O;
   obtaining a query definition Q of a sequence, the Q query including an order definition according to a parameter of the O object;
   constructing a Q' query based on the Q query, the Q' query being different from the Q query by having a reversed ordering of results, with respect to the Q query, and providing results having said parameter value of objects preceding or matching the parameter value of the object O in the sequence of objects in the Q query result set;
   executing the Q' query by a query execution engine;
   checking whether the object O is matched exactly with the first item in Q' result set and in case it is not matched, requesting one object at position P and one object at position P +1, the position P being the position of an object from Q result set corresponding to the first item of Q" result set;
   and in case the Q' result set is empty, choosing an object at the first position in Q result set as the closest one to the object O;
   in case only one of the requested objects is available, choosing the object at the last position of Q result set as the closest one to the object O;
   in case both objects at position P and position P +1 are available, determining which of these objects is closer with respect to the object O and choosing this object as the closest object;
   and - determining the index of the selected closest object in Q sequence as the index of the closest object to the O object.

2. The method according to claim 1 characterized in that the unique identifier value is a numerical value.

3. The method according to claim 1 characterized in that the identifier of the object and the parameter of order definition are the same properties of the object O.

4. The method according to claim 1 characterized in that prior to step the method further comprises the steps of:
   checking whether sort criteria and object constraints match, and in case they do match, proceeding with step, and in case the sort criteria and object constraints match:
   stepping over the data set one element by one for exact match and checking whether the exact match has been found;
   in case of finding exact matching object, returning position of the first exactly matched object;
   in case of not finding exact matching object, returning position of the closest object determined during step by step comparison.

5. The method according to claim 1 characterized in that in case objects at position P and position P +1 are equally distanced to the requested object O, the object of a higher or lower position is returned, depending on system configuration.

6. The method according to claim 1 characterized in that prior to constructing query Q' , the values of parameters of the object O are obtained.

7. The method according to claim 1 characterized in that if the query Q ordering is not strict, then query Q is replaced by query Q1 by the additional order criteria that makes Q1 ordering strict.

8. The method according to claim 5 characterized in that the additional order criteria, in said Q1 query, refer to unique identifiers of objects.

9. The method according to claim 1 characterized in that the executed query Q' is constructed such that that the retrieval of the total count of the Q" results utilizes the already available results.

10. The method according to claim 1 characterized in that the query is executed in an SQL database.

11. A non-transitory computer readable medium storing computer-executable instructions performing all the steps of the method according to claim 1 when executed on a computer.

* * * * *